(12) United States Patent
Lin

(10) Patent No.: US 9,672,405 B2
(45) Date of Patent: Jun. 6, 2017

(54) ELECTRONIC DEVICE AND FINGERPRINT RECOGNITION METHOD

(71) Applicant: Egis Technology Inc., Taipei (TW)

(72) Inventor: Gong-Yi Lin, Taipei (TW)

(73) Assignee: Egis Technology Inc., Taipei (TW)

( * ) Notice: Subject to any disclaimer, the term of this patent is extended or adjusted under 35 U.S.C. 154(b) by 56 days.

(21) Appl. No.: 14/684,299

(22) Filed: Apr. 10, 2015

(65) Prior Publication Data

US 2015/0347812 A1 Dec. 3, 2015

Related U.S. Application Data

(60) Provisional application No. 62/005,223, filed on May 30, 2014.

(30) Foreign Application Priority Data

Nov. 28, 2014 (CN) .......................... 2014 1 0706347

(51) Int. Cl.
*G06K 9/00* (2006.01)
*H04N 5/33* (2006.01)
*H04N 5/225* (2006.01)

(52) U.S. Cl.
CPC ....... *G06K 9/00033* (2013.01); *G06K 9/0004* (2013.01); *G06K 9/0012* (2013.01);
(Continued)

(58) Field of Classification Search
CPC ............. G06K 9/00033; G06K 9/0004; G06K 9/0012; H04N 5/2252; H04N 5/2256; H04N 5/33
(Continued)

(56) References Cited

U.S. PATENT DOCUMENTS 6,888,956 B2 * 5/2005 Muramatsu ........ G06K 9/00899
340/5.83
8,179,430 B2 5/2012 Hyun et al.
(Continued)

FOREIGN PATENT DOCUMENTS

CN 100457031 C 2/2009
CN 203012744 U 6/2013
(Continued)

OTHER PUBLICATIONS

Nagasaka, et al. (Computer English Translation of Japanese Patent No. 2006-155575), pp. 1-10.*
(Continued)

*Primary Examiner* — Daniel Mariam

(57) ABSTRACT

An electronic device and fingerprint recognition method are provided. The electronic device includes a housing, a lens protection cover, a processing unit, an image capturing unit, a light-source sensor and a visible light source module. The lens protection cover is installed on the housing. The light-source sensor is configured to detect external light which comes into the electronic device through the lens protection cover. The processing unit determines whether the detected external light is less than a threshold. The visible light source module is configured to generate visible light. When the detected external light is less than the threshold, the processing unit activates the visible light source module to generate the visible light, and activates the image capturing unit to capture a fingerprint image of a user's finger which is put on the lens protection cover for fingerprint recognition.

10 Claims, 5 Drawing Sheets

(52) U.S. Cl.
CPC ....... *H04N 5/33* (2013.01); *G06K 2009/0006* (2013.01); *H04N 5/2252* (2013.01); *H04N 5/2256* (2013.01)

(58) Field of Classification Search
USPC ............. 382/115, 124, 218, 313; 283/68–69; 340/5.8, 5.81, 5.82, 5.83
See application file for complete search history.

(56) References Cited

U.S. PATENT DOCUMENTS

| | | | | |
|---|---|---|---|---|
| 8,805,028 | B2* | 8/2014 | Miura | G06K 9/00013 340/5.52 |
| 9,076,027 | B2* | 7/2015 | Miura | G06K 9/00087 |
| 2005/0249381 | A1 | 11/2005 | Silvester et al. | |
| 2010/0026453 | A1* | 2/2010 | Yamamoto | G06F 21/32 340/5.83 |
| 2011/0150304 | A1* | 6/2011 | Abe | A61B 5/1172 382/124 |
| 2013/0129163 | A1* | 5/2013 | Chung | G06K 9/228 382/124 |
| 2015/0244939 | A1* | 8/2015 | Liao | H04N 5/23222 348/208.2 |

FOREIGN PATENT DOCUMENTS

| | | |
|---|---|---|
| JP | 2004-064705 | 2/2004 |
| JP | 2006-155575 | 6/2006 |
| JP | 2006-331239 | 12/2006 |
| JP | 2007-249927 | 9/2007 |
| JP | 2008-009821 | 1/2008 |
| JP | 2010-061639 | 3/2010 |
| JP | 2012-008985 | 1/2012 |
| TW | 200931322 | 7/2009 |
| TW | 201035883 | 10/2010 |

OTHER PUBLICATIONS

Japan Patent Office, Office Action, Patent Application Serial No. 2015-110308, Jun. 7, 2016, Japan.
Japan Patent Office, Office Action, Patent Application Serial No. 2015-110308, Feb. 28, 2017, Japan.

* cited by examiner

ELECTRONIC DEVICE AND FINGERPRINT RECOGNITION METHOD

CROSS REFERENCE TO RELATED APPLICATIONS

This Application claims priority of U.S. Patent Application No. 62/005,223 filed on May 30, 2014 and CN Patent Application No. 201410706347.8 filed on Nov. 28, 2014, the entirety of which is incorporated by reference herein.

BACKGROUND OF THE INVENTION

Field of the Invention

The invention generally relates to fingerprint recognition technology, and more particularly to fingerprint recognition technology for utilizing the fingerprint image captured by the image capturing unit of the electronic device to verify the fingerprint.

Description of the Related Art

In recent years, live finger detection technology has developed greatly. Since security codes and access cards may easily be stolen or lost, more attention has been paid to fingerprint-recognition technology. Fingerprints are unique and never-changing, and each person has multiple fingers for identity recognition. In addition, fingerprints can be obtained easily using fingerprint sensors. Therefore, fingerprint recognition can provide increased security and convenience, and financial security and confidential data can be better protected.

In addition, conventional electronic devices such as mobile phones, smartphones, personal digital assistants (PDAs), and other devices are equipped with built-in cameras. Therefore, if the fingerprint image captured by the built-in camera can be used for fingerprint recognition, it will not be required to install an extra fingerprint sensor in each such electronic device.

BRIEF SUMMARY OF THE INVENTION

A fingerprint recognition method and electronic device are provided to utilize the fingerprint image captured by the image capturing unit of the electronic device to verify the fingerprint.

An embodiment of the invention provides an electronic device. The electronic device comprises a housing, a lens protection cover, a processing unit, an image capturing unit, a light-source sensor and a visible light source module. The lens protection cover is installed on the housing. The light-source sensor is configured to detect the external light which comes into the electronic device through the lens protection cover. The processing unit determines whether the detected external light is less than a threshold. The visible light source module is configured to generate visible light. When the processing unit determines the detected external light is less than the threshold, the processing unit activates the visible light source module to generate the visible light and activates the image capturing unit to capture a fingerprint image of a user's finger which is put on the lens protection cover for fingerprint recognition.

An embodiment of the invention provides an electronic device. The electronic device comprises a housing, a lens protection cover, a processing unit, an image capturing unit and a visible light source module. The lens protection cover is installed on the housing and comprises a touch panel to sense a touch event. The visible light source module is configured to generate visible light. When the touch event is sensed, the processing unit activates the visible light source module to generate the visible light and activates the image capturing unit to capture a fingerprint image of a user's finger which touches the touch panel for fingerprint recognition.

An embodiment of the invention provides a fingerprint recognition method. The fingerprint recognition method is applied to an electronic device with a built-in image capturing unit. The fingerprint recognition method comprises the steps of detecting the external light which comes into the electronic device through a lens protection cover which is installed on a housing of the electronic device, determining whether the detected external light is less than a threshold, activating a visible light source module to generate visible light, and activating the image capturing unit to capture a fingerprint image of a user's finger for fingerprint recognition when the processing unit determines the detected external light is less than the threshold.

An embodiment of the invention provides a fingerprint recognition method. The fingerprint recognition method is applied to an electronic device with a built-in image capturing unit. The fingerprint recognition method comprises the steps of sensing a touch event, activating a visible light source module to generate visible light when the touch event is sensed, and activating the image capturing unit to capture a fingerprint image of a user's finger for fingerprint recognition when the touch event is sensed.

Other aspects and features of the invention will become apparent to those with ordinary skill in the art upon review of the following descriptions of specific embodiments of electronic device and fingerprint recognition method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
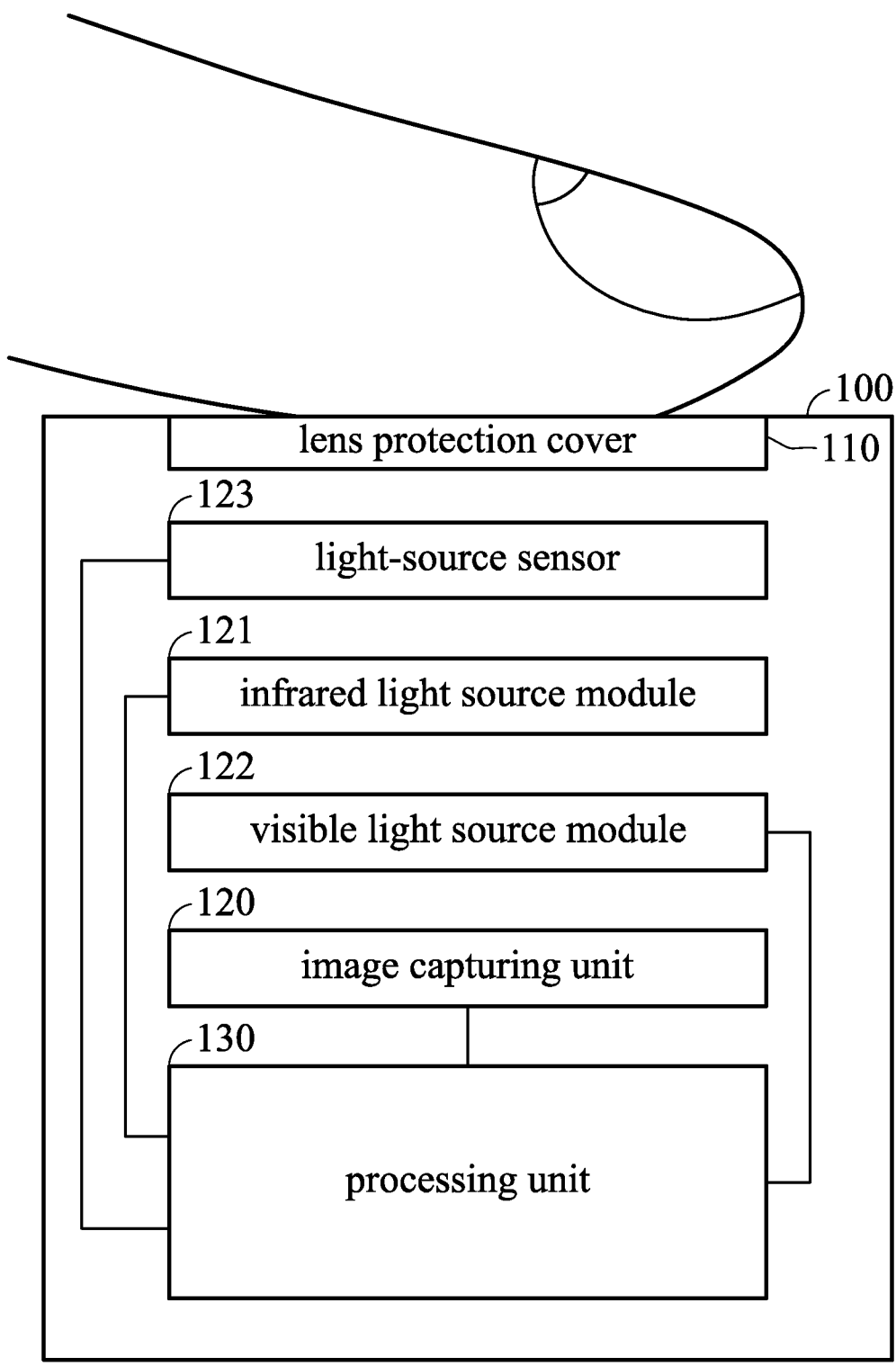
FIG. 1 is a block diagram of an electronic device 100 according to an embodiment of the invention.

FIG. 1 is a block diagram of an electronic device 100 according to an embodiment of the invention. In an embodiment of the invention, the electronic device 100 is an electronic device with a built-in camera, such as a mobile phone, a smartphone, a tablet PC, a notebook or another electronic device.

As shown in FIG. 1, the electronic device 100 comprises a lens protection cover 110, an image capturing unit 120 and a processing unit 130. FIG. 1 presents a simplified block diagram in which only the elements relevant to the invention are shown. However, the invention should not be limited to what is shown in FIG. 1. In addition, in some embodiments of the invention, the infrared light source module 121 and the light-source sensor 123 of FIG. 1 are optional. In some embodiments of the invention, the electronic device 100 may comprise both of the infrared light source module 121 and light-source sensor 123. In some embodiments of the invention, the electronic device 100 may comprise either the infrared light source module 121 or the light-source sensor 123. In yet other embodiments, the electronic device 100 may comprise neither the light source module 121 nor the light-source sensor 123.

In an embodiment of the invention, the lens protection cover 110 is installed on a device housing (e.g. device housing 140 in FIG. 2) to protect the lens of the image capturing unit 120. In an embodiment of the invention, the lens protection cover 110 may be made of anti-reflective material. In addition, the lens protection cover 110 may further comprise an antifouling layer, which prevents dirt particles and oil from falling or being attached onto the lens protection cover 110. In an embodiment of the invention, the lens protection cover 110 may further comprise a touch panel to sense the touch of the user on the lens protection cover 110. In another embodiment of the invention, the lens protection cover 110 is a touch panel to sense the touch of the user on the lens protection cover 110.

In an embodiment of the invention, the image capturing unit 120 may be the built-in camera of the electronic device 100. The image capturing unit 120 is configured to capture the image data, and then the image data will be provided to the processing unit 130 or stored in a storage unit (not shown in figures). In an embodiment of the invention, the electronic device 100 further comprises an infrared light source module 121 and a visible light source module 122. The infrared light source module 121 is configured to provide the infrared light for image capturing by the image capturing unit 120, and during the image capturing, the image capturing unit 120 can capture the image data of the veins and tissues of dermis of human finger for performing live finger detection. The visible light source module 122 is configured to provide the visible light for the image capturing unit 120 to capture the image data of the outer skin of a human finger for fingerprint recognition.

Figure 2A:
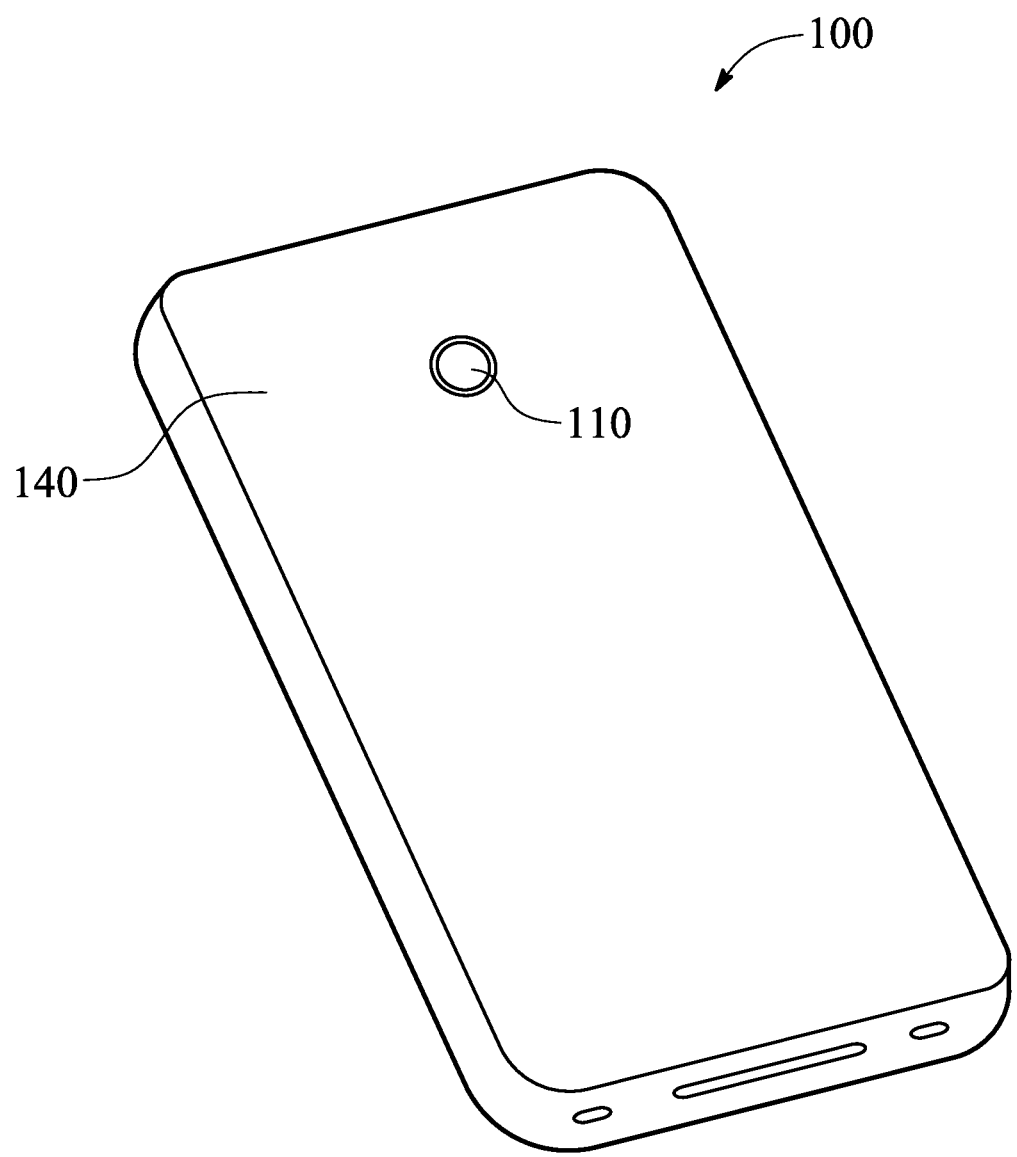
FIGS. 2A-2B are schematic diagrams illustrating a user putting his or her finger on the lens protection cover 110 according to an embodiment of the invention.
Figure 2B:
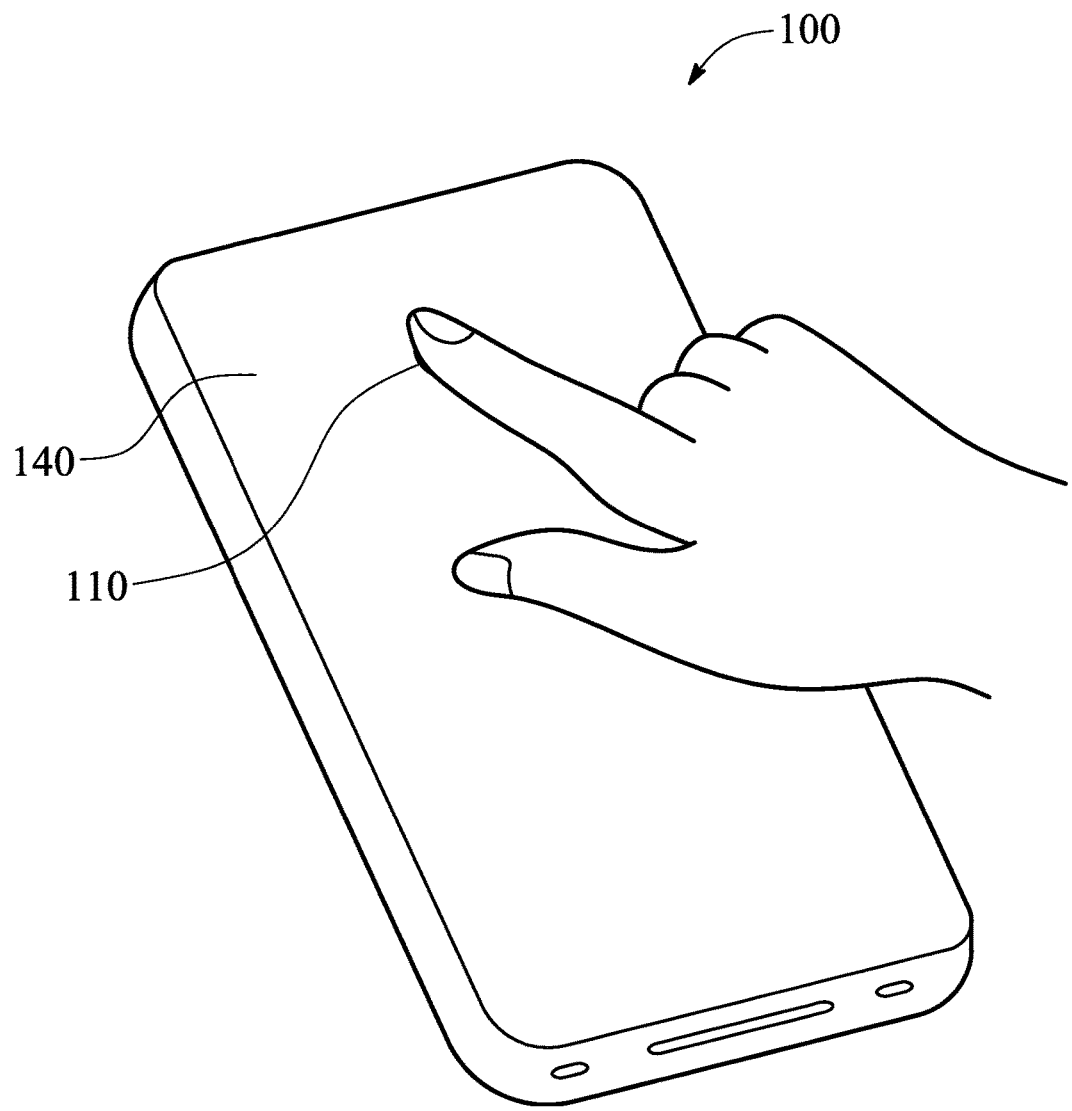

In an embodiment of the invention, when fingerprint verification is required, as shown in FIGS. 2A-2B, the user will put his or her finger on the lens protection cover 110. Then, the visible light source module 122 generates the visible light, and the image capturing unit 120 captures the image data of the outer skin of the user's finger for fingerprint recognition. Note that, in FIGS. 2A-2B, the electronic device 100 is illustrated as a smartphone, but the invention is not limited thereto. The electronic device 100 may be any other electronic device with a built-in camera.

In an embodiment of the invention, the electronic device 100 further comprises a light-source sensor 123. When fingerprint recognition is required for the electronic device 100 to continue an operation or initiate an application, e.g. when the electronic device 100 is in a sleeping mode and fingerprint recognition is required for waking up the electronic device 100, the electronic device 100 will activate the light-source sensor 123 to detect the external light which comes into the electronic device 100 through the lens protection cover 110. Then the processing unit 130 determines whether the detected external light is less than a threshold in order to determine whether a verification object (e.g. user's finger) is put on the lens protection cover 110.

The external light is the light coming from the outside environment, and is used for the image capturing unit 120 (e.g. a camera) to capture pictures of objects in the outside environment. When the external light which comes into the electronic device 100 through the lens protection cover 110 is less than the threshold, it means that the external light is blocked by the finger placed on the lens protection cover 110. The electronic device 100 will activate the visible light source module 122 and the image capturing unit 120. Then, the visible light source module 122 provides the visible light for the image capturing unit 120 to capture the image data of the outer skin of the finger. Then, the image capturing unit 120 will transmit the captured image data to the processing unit 130 for fingerprint recognition.

In an embodiment of the invention, when the external light which comes into the electronic device 100 through the lens protection cover 110 is less than the threshold, i.e. the external light is blocked by an object placed on the lens protection cover 110, the electronic device 100 will activate the infrared light source module 121 and the image capturing unit 120. The infrared light source module 121 will generate the infrared light for the image capturing unit 120 to capture the image data of the dermis of user's finger in order to determine whether the finger put on the lens protection cover 110 is a live finger. When the processing unit 130 of the electronic device 100 determines the verification object put on the lens protection cover 110 is a live finger, the electronic device 100 will activate the visible light source module 122. Then, the visible light source module 122 provides the visible light for the image capturing unit 120 to capture the image data of the outer skin of the live finger. Then, the image capturing unit 120 will transmit the captured image data to the processing unit 130 for fingerprint recognition.

In another embodiment of the invention, the lens protection cover 110 is a touch panel (not shown in figures). When the user puts his or her finger on the lens protection cover 110, the lens protection cover 110 will sense a touch event. The electronic device 100 will activate the visible light source module 122 and the image capturing unit 120. Then, the visible light source module 122 provides the visible light for the image capturing unit 120 to capture the image data of the outer skin of the finger. Then, the image capturing unit 120 will transmit the image data to the processing unit 130 for fingerprint recognition.

In another embodiment of the invention, when the lens protection cover 110 senses a touch event, the electronic device 100 will first activate the infrared light source module 121 and the image capturing unit 120. The infrared light source module 121 will generate the infrared light for the image capturing unit 120 to capture the image data of the dermis of user's finger to determine whether the finger put on the lens protection cover 110 is a live finger. The image capturing unit 120 will then transmit the image data to the processing unit 130. The processing unit 130 will perform live finger detection (e.g. vein recognition). When performing live finger detection, the processing unit will analyze whether the verification object has live biometric features (e.g. veins and tissues) so as to determine whether the verification object is a live finger or a dead finger (e.g. a forged finger).

In another embodiment of the invention, when the processing unit 130 determines the verification object is a live finger, the processing unit 130 will turn off the infrared light source module 121 and activate the visible light source module 122. When the user puts his or her finger on the lens protection cover 110, the external light coming from the external environment will be blocked by the user's finger and the visible light source module 122 will provide the visible light for the image capturing unit 120 to capture the image data of the outer skin of the finger. After activating the visible light source module 122, the processing unit 130 will instruct the image capturing unit 120 to capture the image data. After the image capturing unit 120 has captured the image data, the image capturing unit 120 will transmit the image data to the processing unit 130 and the processing unit 130 will perform fingerprint recognition according to the image data.

Figure 3:
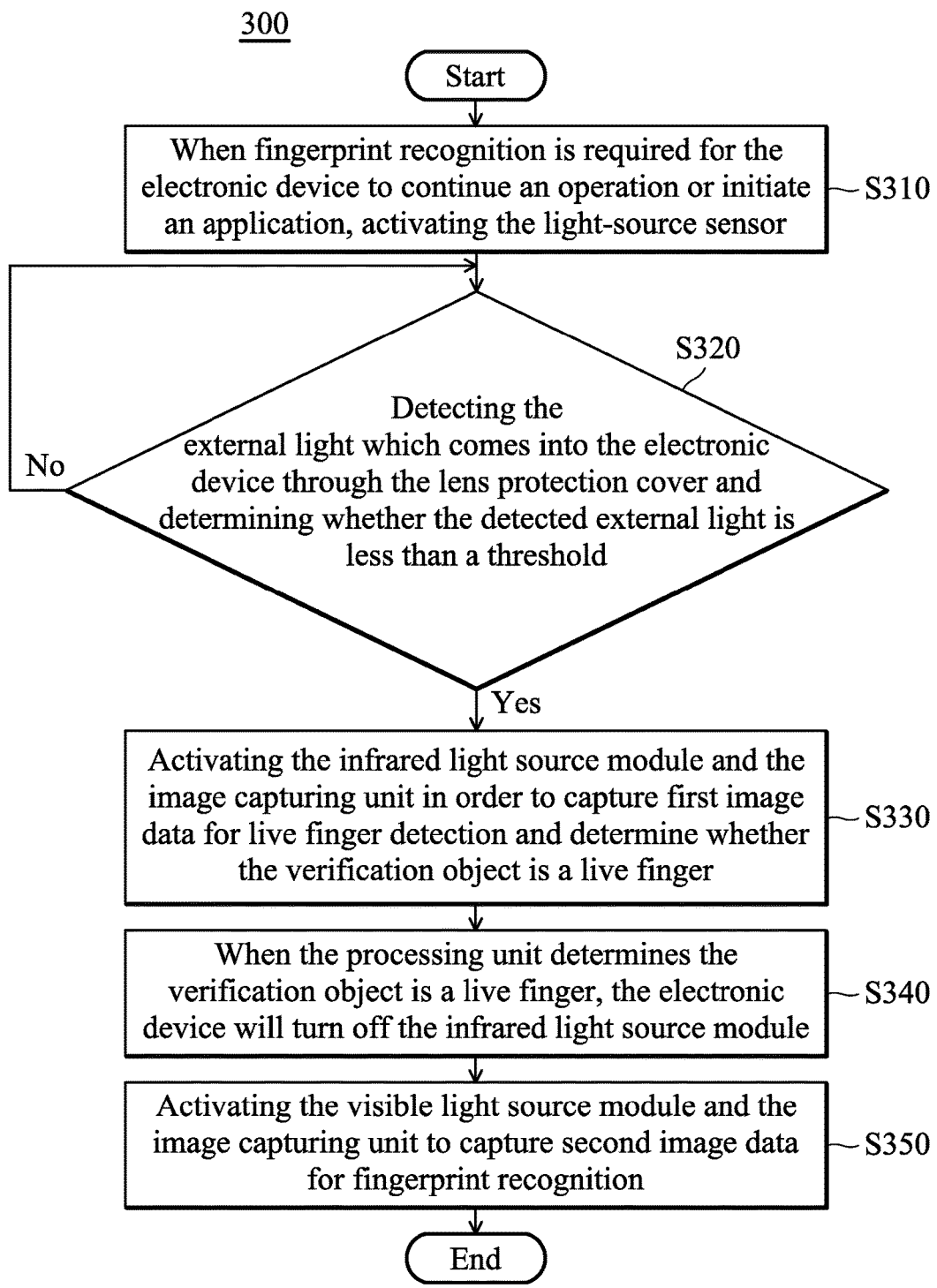
FIG. 3 is a flow chart 300 illustrating a fingerprint recognition method according to an embodiment of the invention.

FIG. 3 is a flow chart 300 illustrating a fingerprint recognition method according to an embodiment of the invention. The fingerprint recognition method is applied to the electronic device 100. As shown in FIG. 3, in step S310, when fingerprint recognition is required for the electronic device 100 to continue an operation or initiate an application, the electronic device 100 will activate the light-source sensor 123. In step S320, the light-source sensor 123 detects the external light which comes into the electronic device 100 through the lens protection cover 110 and the processing unit 130 determines whether the detected external light is less than a threshold. If the detected external light is less than a threshold, i.e. the verification object has been put on the lens protection cover 110, step S330 will be performed. If the detected external light is not less than a threshold, i.e. the verification object has not been put on the lens protection cover 110, step S320 will be performed.

In step S330, if the detected external light is less than a threshold, the electronic device 100 will first activate the infrared light source module 121 and the image capturing unit 120 in order to capture first image data for live finger detection and determine whether the verification object is a live finger. In step S340, when the processing unit 130 determines the verification object is a live finger, the electronic device 100 will turn off the infrared light source module 121. In step S350, the electronic device 100 activates the visible light source module 122 and the image capturing unit 120 to capture second image data for fingerprint recognition. In an embodiment of the invention, in the flow chart 300, step S330 and step S340 are optional. Therefore, step S350 can be performed immediately after step S320.

Figure 4:
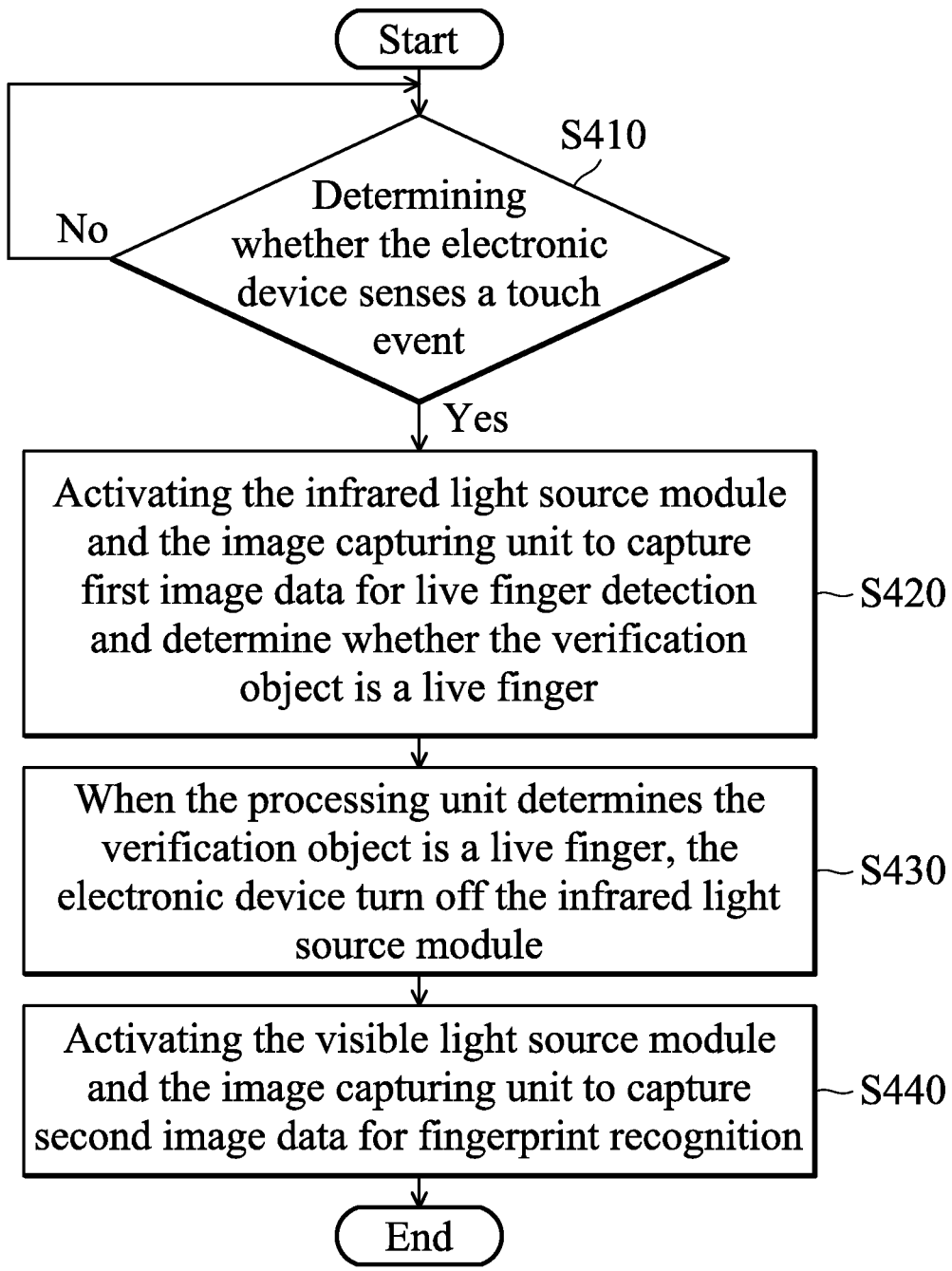
FIG. 4 is a flow chart 400 illustrating a fingerprint recognition method according to another embodiment of the invention.

FIG. 4 is a flow chart 400 illustrating a fingerprint recognition method according to another embodiment of the invention. The fingerprint recognition method is applied to the electronic device 100. As shown in FIG. 4, in step S410, the electronic device 100 determines whether it senses a touch event. If a touch event is sensed, i.e. the verification object touches the lens protection cover 110 (comprising a touch panel), step S420 will be performed. In step S420, when the touch event is sensed, the electronic device 100 will activate the infrared light source module 121 and the image capturing unit 120 to capture first image data for live finger detection and determine whether the verification object is a live finger. In step S430, when the processing unit determines the verification object is a live finger, the electronic device 100 will turn off the infrared light source module 121. In step S440, the electronic device 100 activates the visible light source module 122 and the image capturing unit 120 to capture second image data for fingerprint recognition. In an embodiment of the invention, step S420 and step S430 are optional. Therefore, in the flow chart 400, step S440 can be performed immediately after step S410.

According to the fingerprint recognition method in the embodiments of the invention, the user only needs to put his or her finger on the lens protection cover of the electronic device for fingerprint recognition. Therefore, the fingerprint recognition method in the embodiments of the invention provides the user with a simple, easy and efficient fingerprint recognition operation. In addition, according to the fingerprint recognition method in the embodiments of the invention, the electronic device does not need to install or configure an extra fingerprint sensor.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. An electronic device, comprising:
   a housing;
   a lens protection cover, installed on the housing;
   an image capturing unit;
   a light-source sensor, detecting external light which comes into the electronic device through the lens protection cover;
   a processor, determining whether the detected external light is less than a threshold; and a visible light source generator, connected to the processor, generating visible light;

wherein when the processor determines the detected external light is less than the threshold, the processor activates the visible light source generator to generate the visible light and activates the image capturing unit to capture a fingerprint image of a user's finger which is put on the lens protection cover for fingerprint recognition.

2. The electronic device of claim 1, further comprising:
an infrared light source generator, connected to the processor, generating infrared light;
wherein when the detected external light is less than the threshold, the processor activates the infrared light source generator to generate the infrared light and activates the image capturing unit to capture the biometric image of the user's finger for live finger detection.

3. The electronic device of claim 1, wherein when fingerprint recognition is required for the electronic device to continue an operation or initiate an application, the processor activates the light-source sensor to detect the external light which comes into the electronic device through the lens protection cover and determines whether the detected external light is less than the threshold.

4. An electronic device, comprising:
a housing;
a lens protection cover, installed on the housing and comprising a touch panel to sense a touch event;
a processor;
an image capturing unit; and
a visible light source generator, connected to the processor, generating visible light;
wherein when the touch event is sensed, the processor activates the visible light source generator to generate the visible light and activates the image capturing unit to capture a fingerprint image of a user's finger which touches the touch panel for fingerprint recognition.

5. The electronic device of claim 4, further comprising:
an infrared light source generator, connected to the processor, generating infrared light;
wherein when the touch event is sensed, the processor activates the infrared light source generator to generate the infrared light and activates the image capturing unit to capture the biometric image of the user's finger for live finger detection.

6. A fingerprint recognition method, applied to an electronic device with a built-in image capturing unit, the fingerprint recognition method comprising:
detecting external light which comes into the electronic device through a lens protection cover which is installed on a housing of the electronic device;
determining whether the detected external light is less than a threshold;
activating a visible light source generator to generate visible light; and
activating the image capturing unit to capture a fingerprint image of a user's finger for fingerprint recognition when the detected external light is less than the threshold.

7. The fingerprint recognition method of claim 6, further comprising:
activating an infrared light source generator to generate infrared light when the detected external light is less than the threshold; and
activating the image capturing unit to capture the biometric image of the user's finger for live finger detection.

8. The fingerprint recognition method of claim 6, further comprising:
activating a light-source sensor to detect the external light which comes into the electronic device through the lens protection cover; and
determining whether the detected external light is less than the threshold, when fingerprint recognition is required for the electronic device to continue an operation or initiate an application.

9. A fingerprint recognition method, applied to an electronic device with a built-in image capturing unit, and a lens protection cover installed on a housing of the electronic device, the lens protection cover comprising a touch panel to sense a touch event, the fingerprint recognition method comprising:
sensing a touch event;
activating a visible light source generator to generate visible light when the touch event is sensed; and
activating the image capturing unit to capture a fingerprint image of a user's finger for fingerprint recognition.

10. The fingerprint recognition method of claim 9, further comprising:
activating an infrared light source generator to generate infrared light when the touch event is sensed; and
activating the image capturing unit to capture the biometric image of the user's finger for live finger detection.

\* \* \* \* \*